United States Patent
Imai et al.

(10) Patent No.: US 7,182,712 B2
(45) Date of Patent: Feb. 27, 2007

(54) METHOD FOR REGULATING OFFSET OF CURRENT DETECTION SIGNAL IN DRIVING POWER TRANSMISSION CONTROLLER

(75) Inventors: Fukami Imai, Kariya (JP); Hisaaki Wakao, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 161 days.

(21) Appl. No.: 10/490,117

(22) PCT Filed: Apr. 25, 2003

(86) PCT No.: PCT/JP03/05320

§ 371 (c)(1),
(2), (4) Date: Feb. 25, 2005

(87) PCT Pub. No.: WO03/091590

PCT Pub. Date: Nov. 6, 2003

(65) Prior Publication Data

US 2005/0148429 A1     Jul. 7, 2005

(30) Foreign Application Priority Data

Apr. 25, 2002   (JP) ............................. 2002-123950

(51) Int. Cl.
    *B60W 10/02* (2006.01)
(52) U.S. Cl. ...................................... 477/174
(58) Field of Classification Search ................ 477/174, 477/175
    See application file for complete search history.

(56) References Cited

U.S. PATENT DOCUMENTS 6,834,225 B1 *  12/2004  Jiang et al. .................... 701/67
6,945,909 B2 *   9/2005  Maekawa ..................... 477/175

FOREIGN PATENT DOCUMENTS

| GB | 2242289     | 9/1991  |
|----|-------------|---------|
| JP | 62-251250   | 11/1987 |
| JP | 3-14961     | 1/1991  |
| JP | 2000-110855 | 4/2000  |
| JP | 2000-137040 | 5/2000  |
| JP | 2002-31222  | 1/2002  |

* cited by examiner

*Primary Examiner*—Dirk Wright
(74) *Attorney, Agent, or Firm*—Oblon, Spivak, McClelland, Maier & Neustadt, P.C.

(57) ABSTRACT

An offset value setting processing, in which whether or not all wheel velocities of front wheels and rear wheels are 0 km/h is determined and whether or not a pressing amount of an accelerator pedal is 0% is determined. If it is determined that the vehicle velocity is 0 km/h and that the pressing amount of the accelerator pedal is 0%, a current detection signal voltage at that time is set to an offset voltage. Thus, the offset voltage value is reset and set again if such a condition is established. Consequently, the offset voltage value including the amount of an error due to a temperature drift is set up, thereby preventing drop in control accuracy due to that error.

4 Claims, 4 Drawing Sheets

METHOD FOR REGULATING OFFSET OF CURRENT DETECTION SIGNAL IN DRIVING POWER TRANSMISSION CONTROLLER

TECHNICAL FIELD

The present invention relates to an offset adjusting method for a current detection signal in a drive power transmission control apparatus.

BACKGROUND ART

As an example of the drive power transmission control apparatus for vehicles, there are types in which the drive power transmission amount is controlled by duty-controlling an electromagnet in an "electromagnetic clutch" as disclosed in Japanese Utility Model No. HEI6-16731 or "drive power transmission control apparatus" as disclosed in an applied specification of JP No. 2001-003937 A. In such a drive power transmission control apparatus, magnetic force for attracting an armature to the electromagnet is generated by supplying excitation current duty-controlled to an electromagnetic coil of the electromagnet, so that the armature is attracted to the side of a friction clutch. Consequently, the clutch is engaged with a pressure corresponding to the magnitude of the magnetic force so as to transmit the drive power. That is, torque to be transmitted to the front wheels and rear wheels of a vehicle is divided depending on a current value of the excitation current to be supplied to the electromagnetic coil of the electromagnet.

The excitation current to be supplied to the electromagnetic coil is detected by a current detection circuit for detecting that excitation current and inputted to the electronic control unit (ECU) of the drive power transmission control apparatus as a current detection signal. As a result, a control loop in which the input of the current detection signal is negative fed-back is constructed. Thus, the excitation current following a current instruction value determined by the ECU can be supplied to the electromagnetic coil of the electromagnet.

The current detection signal to be outputted from the current detection circuit is generally outputted through an operational amplifier after it is converted to a voltage signal. A configuration in which the voltage from an amplifying circuit is outputted as an offset voltage when no current is supplied to the electromagnetic coil of the electromagnet, that is, the value of the excitation current is 0 A (zero ampere) is often adopted. On the other hand, the output voltage by the current detection signal when the excitation current is 0 A is always deflected due to changes in the ambient temperature of the current detection circuit, deviation of the electric characteristic of component part and the like.

Thus, when the value of the excitation current is 0 A, so-called zero point adjustment in which the output voltage of the current detection circuit at that time is set up as an offset voltage needs to be carried out. Conventionally, a period in which no current is supplied to the electromagnetic coil of the electromagnet at the time of startup is provided and the offset adjustment control processing which performs the zero point adjustment in this while is carried out by the ECU which is the drive power transmission control apparatus.

However, in the above-described offset adjustment processing, most semiconductor components, resistors, capacitors and the like of an operational amplifier and the like constituting the current detection circuit have a particular temperature characteristic that their amplification factor or impedance is changed due to changes in the temperature. For the reason, so-called temperature drift that the voltage of a detection signal is changed depending on changes in the temperature of the current detection circuit may occur. Consequently, there is generated a deviation (Vof1–Vof2) in the offset voltage value between the offset voltage value Vof1 (for example, ambient temperature of 25° C.) at the time of offset adjustment processing executed just after the startup and the offset voltage value Vof2 (for example, ambient temperature of 80° C.) just after a temperature rise. Because the deviation of the offset voltage value affects the voltage value of a detection signal from the current detection circuit directly, an error occurs in distribution of torque to be transmitted to the front wheel and rear wheel of the vehicle because of current control containing such an error. As a result, there exists such a problem that a scheduled torque distribution cannot be controlled precisely.

It may be considered depending on people that the not so remarkable error in the current detection signal generated due to such a temperature drift hardly affects a feeling of passengers in the vehicle even if there is generated the error in the distribution of the torque between the front wheel and rear wheel of the vehicle. However, the improvement of the control accuracy in the vehicle drive power transmission control apparatus is an indispensable matter because the improvement of the control accuracy in the vehicle drive power transmission control apparatus relating to such a factor contributes to suppression of the deviation in the entire motion control system.

The present invention has been achieved to solve the above-described problem and an object of the present invention is to provide an offset adjustment method for a current detection signal in the drive power transmission control apparatus capable of controlling the torque distribution precisely.

DISCLOSURE OF THE INVENTION

In order to achieve the above object, according to claim 1, an offset adjusting method for a current detection signal in a drive power transmission control apparatus for controlling a transmission amount of drive power by the a drive power transmission apparatus by controlling a current, is comprising:

a first step of determining whether or not all the wheel velocities of vehicle wheels are 0 km/h;

a second step of determining whether or not the pressing amount of the accelerator pedal is 0%; and a third step of, if it is determined that all the wheel velocities are 0 km/h in said first step and the pressing amount of the accelerator pedal is 0% in said second step, the value of said current detection signal at that time is set to an offset value.

Further, according to claim 2, an offset adjusting method for a current detection signal in a drive power transmission control apparatus for controlling the transmission amount of a drive power by a drive power transmission apparatus based on a current detection signal outputted from a circuit for detecting a current, is comprising:

a first step of determining whether or not all the wheel velocities of vehicle wheels are 0 km/h;

a second step of determining whether or not the opening degree of a suction throttle valve is substantially 0%; and a third step of if it is determined that all the wheel velocities are 0 km/h in said first step and the opening degree of the suction throttle valve is substantially 0% in said second step, setting the value of said current detection signal at that time to an offset value. "A suction throttle valve" means a variable throttle provided halfway of an suction path of internal combustion.

According to the inventions of claim 1 and claim 2, if it is determined that all wheel velocities are 0 km/h and that the pressing amount of the accelerator pedal is 0% or the opening degree of a suction throttle valve is substantially 0%, that is, if the vehicle is stopped or its accelerator pedal is not pressed by a vehicle driver, the value of the current detection signal at that time is set to an offset value. Because the offset value is set when such a condition is established, that offset value can be reset and set again not only just after a startup but also even when the ambient temperature of the current detection circuit is raised if the condition for the ambient temperature is established. Thus, even if the ambient temperature of the current detection circuit is raised, the offset value can be set taking that matter into account, thereby preventing generation of an error which may occur in a current detection signal due to a temperature drift. Therefore, control accuracy performance is improved, so that torque distribution can be controlled at a high accuracy.

Further, according to claim 3, the offset adjusting method for a current detection signal in a drive power transmission control apparatus according to claim 1 or claim 2 wherein said third step is carried out after a predetermined period passes since the value of said current detection signal is set to the offset value last.

Because according to the invention of claim 3, the third step is executed after a predetermined period passes since the value of the current detection signal is set to the offset value last, setting of the offset value in the third step is not executed even if the condition for the first step and second step is established in the predetermined period. Consequently, occurrence of such an unstable condition of the offset value that the set offset value is reset and set again repeatedly in a short period can be prevented. Therefore, torque distribution can be controlled at a high precision under a stable control performance.

BEST MODE FOR CARRYING OUT THE INVENTION

Hereinafter, the embodiment of the offset adjustment method for a current detection signal in the drive power transmission control apparatus of the present invention will be described with reference to the accompanying drawings.

For this embodiment, an example in which the present invention is applied to the drive power transmission control apparatus for controlling the drive power transmission apparatus of a 4-wheel drive vehicle will be described with reference to FIGS. 1–4.

Figure 1:
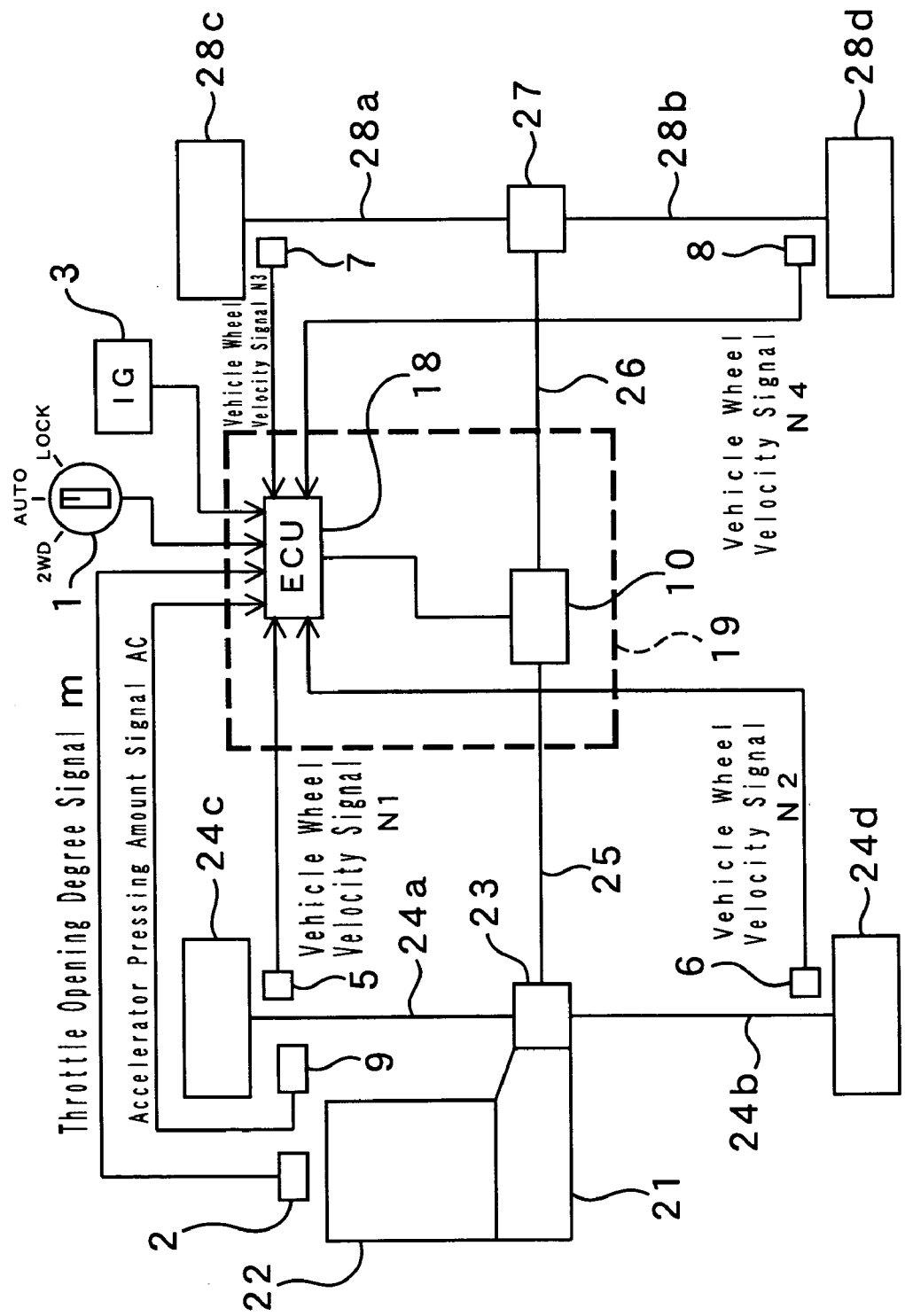
FIG. 1 is an explanatory diagram showing the schematic structure of a 4-wheel drive vehicle loaded with a drive power transmission control apparatus according to an embodiment of the present invention.
Figure 2:
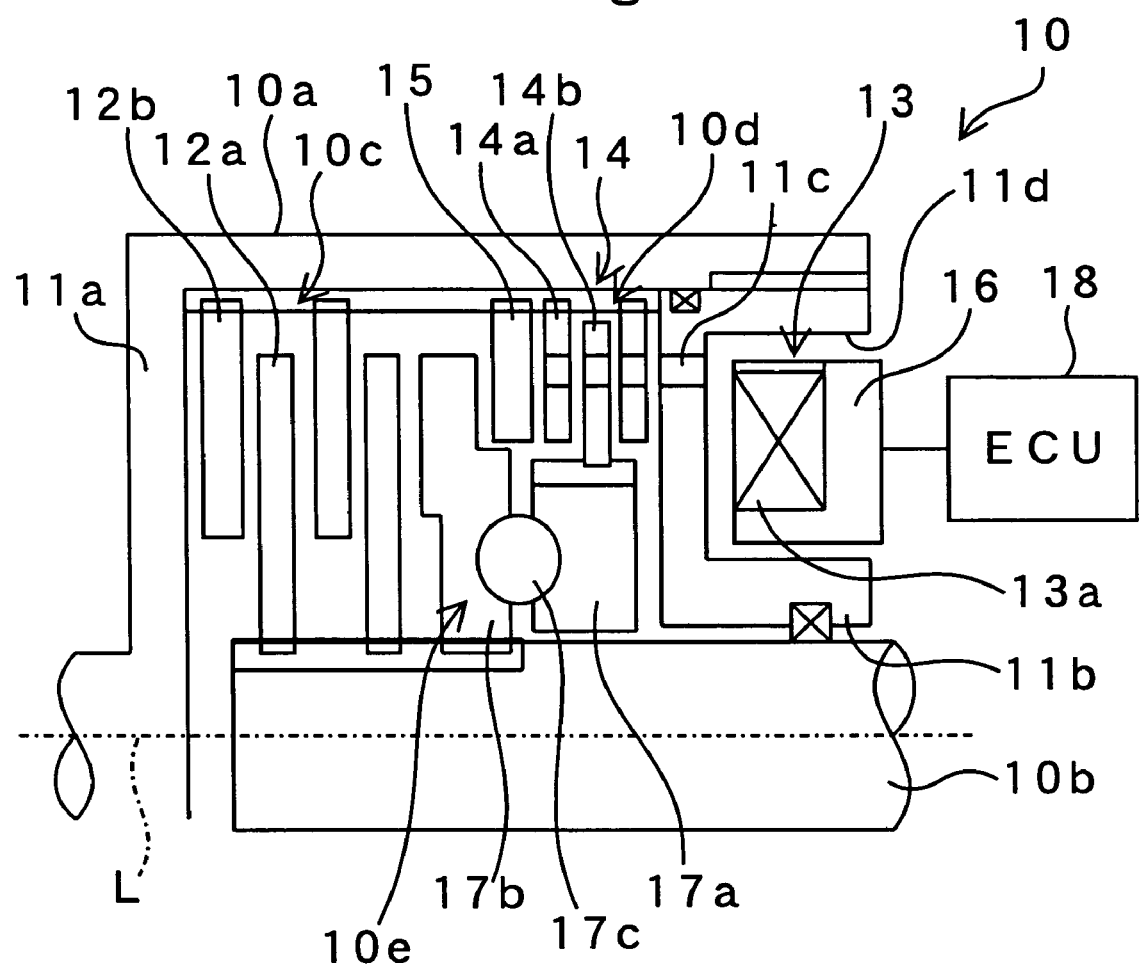
FIG. 2 is a partial sectional view showing the structure of the drive power transmission apparatus shown in FIG. 1.

FIG. 1 is an explanatory diagram showing the schematic structure of the 4-wheel drive vehicle loaded with the drive power transmission control apparatus 19 of this embodiment. FIG. 2 is a partial sectional view showing the structure of the drive power transmission apparatus 10 of this embodiment. Because the drive power transmission apparatus 10 is substantially symmetrical with respect to a rotation axis L, it should be noted that the same Figure represents substantially half section of the drive power transmission apparatus 10 while representation of the other half section is omitted.

As shown in FIG. 1, the drive power transmission control apparatus 19 comprises the drive power transmission apparatus 10 and the ECU 18. Prior to description of the structures of the drive power transmission control apparatus 19 and the power transmission apparatus 10, the structure of the 4-wheel drive vehicle loaded with the drive power transmission apparatus 19 will be described with reference to FIG. 1.

In the 4-wheel drive vehicle, the trans axle 21 includes a transmission, transfer and front differential and outputs a drive power of an engine 22 to both axle shafts 24a, 24a through a front differential 23 of the trans axle 21 so as to drive the right and left front wheels 24b, 24b. Further, this drive power is outputted to the side of a first propeller shaft 25 also.

The first propeller shaft 25 is connected to a second propeller shaft 26 through a drive power transmission apparatus 10. If the first propeller shaft 25 and the second propeller shaft 26 are connected to each other so that a torque can be transmitted, a drive power of the engine 22 is transmitted to a rear differential 27 and outputted to both axle shafts 28a, 28b from the rear differential 27 so as to drive the right and left rear wheels 28c, 28d.

Rotation sensors 5, 6, 7, 8 for detecting the rotation velocity of the wheel are provided on vehicle wheels 24c, 24d, 28c, 28d and vehicle wheel velocity signals N1–N4 are outputted from the rotation sensors 5–8. The respective vehicle wheel velocity signals N1–N4 are data coinciding with or proportional to the rotation number (rpm) of each wheel.

An indicated throttle valve provided halfway of an suction path of the engine 22 is provided with a throttle opening degree sensor 2 for detecting the degree of opening of the throttle valve. A throttle opening degree signal m is outputted from the throttle opening degree sensor 2. Further, an indicated accelerator pedal is provided with an accelerator pressing amount sensor 9 for detecting the pressing amount of the accelerator pedal. An accelerator pressing amount signal AC is outputted from the accelerator pressing amount sensor 9.

The vehicle wheel velocity signals N1–N4, the throttle opening degree signal m, the accelerator pressing amount signal AC, and the output signal of a drive mode selection switch 1 are inputted to the ECU 18.

The drive power transmission apparatus 10 is disposed between the first propeller shaft 25 and the second propeller shaft 26 and has a role of transmitting and outputting a drive power inputted from the first propeller shaft 25 to the second propeller shaft 26. Here, the structure of the drive power transmission apparatus 10 will be described with reference to FIG. 2.

As shown in FIG. 2, the drive power transmission apparatus 10 comprises an outer case 10a, an inner shaft 10b, a main clutch mechanism 10c, a pilot clutch mechanism 10d, a cam mechanism 10e and the like.

The outer case 10a is comprised of a bottomed cylindrical housing 11a and a rear cover 11b which is fit to the rear end opening section of the housing 11a through screw thread so as to cover the same opening section. An end section of the first propeller shaft 25 shown in FIG. 1 is connected to the front end of the housing 11a which constitutes the outer case 10a so that a torque can be transmitted between them.

The inner shaft 10b is inserted into the outer case 10a coaxially such that it goes liquid-tightly through the central section of the rear cover 11b and supported rotatably by the housing 11a and the rear cover 11b in a condition that the motion thereof in the axial direction is restricted. Then, the front end of the second propeller shaft 26 is connected to this inner shaft 10b so as to be capable of transmitting the torque.

A main clutch mechanism 10c is a wet multiple-plate type friction clutch, which comprises plural clutch plates of inner clutch plate 12a and outer clutch plate 12b, and disposed within the housing 11a. Each inner clutch plate 12a is spline-fit to the outer periphery of the inner shaft 10b so that it is capable of moving in the axial direction. Each outer clutch plate 12b is spline-fit to the inner periphery of the housing 11a so that it is capable of moving in the axial direction. The inner clutch plate 12a and the outer clutch plate 12b are disposed alternately and they can contact each other so as to engage with friction and separate from each other to a free state.

A pilot clutch mechanism 10d is an electromagnetic clutch, which comprises an electromagnet 13, a friction clutch 14, an armature 15 and a yoke 16.

An annular electromagnet 13 is constructed of an electromagnetic coil 13a wound around the rotation axis L and fit in an annular concave section 11d in the rear cover 11b through a predetermined gap such that it is fit to a yoke 16. The yoke 16 is fixed to the body side in a condition that it is supported rotatably by the outer periphery of the rear end section of the rear cover 11b.

The rear cover 11b is comprised of an inner cylindrical section made of magnetic material whose section in the radius direction is substantially L-shaped, an outer cylindrical section made of substantially annular magnetic material provided on the outer periphery of that inner cylindrical section and shutdown member 11c made of substantially annular non-magnetic material fixed between the inner cylindrical section and the outer cylindrical section.

The friction clutch 14 is a wet multiple-plate friction clutch comprised of multiple clutch plates of outer clutch plates 14a and inner clutch plates 14b. Each outer clutch plate 14a is spline-fit to the inner periphery of the housing 11a so that it is capable of moving in the axial direction. Each inner clutch plate 14b is spline-fit to the outer periphery of a first cam member 17a constituting a cam mechanism 10e, which will be described later, so that it is capable of moving in the axial direction.

The annular armature 15 is spline-fit to the inner periphery of the housing 11a so that it is capable of moving in the axial direction and disposed in front of the friction clutch 14 such that it opposes the friction clutch 14.

In the pilot clutch mechanism 10d having such a structure, if excitation current is supplied to the electromagnetic coil 13a in order to excite the electromagnet 13, a loop-like circulating magnetic path is formed such that circulating magnetic flux passes from the electromagnet 13 to the yoke 16, the rear cover 11b, the friction clutch 14, to the armature 15. The excitation current supplied to the magnetic coil 13a of the electromagnet 13 is controlled as described later to a predetermined current value set up by duty-control of the ECU 18.

Turning ON/OFF the excitation current to be supplied to the electromagnetic coil 13a of the electromagnet 13 is carried out by selecting operation of the drive mode selection switch 1 shown in FIG. 1, so that three drive modes can be selected. The drive mode selection switch 1 is disposed in the vicinity of a driver's seat in the vehicle compartment so that it can be operated easily by the driver. In the meantime, if the drive power transmission control unit 19 is constructed with only a second drive mode (AUTO mode) which will be described later, it is possible to omit the drive mode selection switch 1.

The cam mechanism 10e which is a converting mechanism is comprised of a first cam member 17a, a second cam member 17b and a cam follower 17c. The first cam member 17a is fit to the outer periphery of the inner shaft 10b rotatably and supported rotatably by the rear cover 11b. An inner clutch plate 14b of the friction clutch 14 is spline-fit to the outer periphery thereof.

The second cam member 17b is spline-fit to the outer periphery of the inner shaft 10b so that it is capable of rotating integrally and disposed to oppose the rear side of the inner clutch plate 12a of the main clutch mechanism 10c. A ball-like cam follower 17c is fit into cam grooves opposing each other in the first cam member 17a and the second cam member 17b.

In the drive power transmission apparatus 10 having such a structure, if the electromagnetic coil 13a of the electromagnet 13 which constitutes the pilot clutch mechanism 10d is supplied with no electricity, that is, no excitation current is supplied, no magnetic path is formed, so that the friction clutch 14 is in non-engagement state and consequently, the pilot clutch mechanism 10d is in non-operating condition. Then, the first cam member 17a which constitutes the cam mechanism 10e becomes capable of rotating integrally with the second cam member 17b through the cam follower 17c, so that the main clutch mechanism 10c turns into the non-operating condition. Consequently, the vehicle turns into a first drive mode (2WD mode) which is 2-wheel drive.

If the excitation current is supplied to the electromagnetic coil 13a of the electromagnet 13, a loop-like circulating magnetic path is formed starting from the electromagnet 13 in the pilot clutch mechanism 10d so as to generate a magnetic force and consequently, the electromagnet 13 attracts the armature 15. Thus, the armature 15 presses the friction clutch 14 and engages with friction so as to produce a torque. Consequently, the first cam member 17a of the cam mechanism 10e is connected to the side of the outer case 10a so that a relative rotation is generated with the second cam member 17b. As a result, in the cam mechanism 10e, the cam follower 17c generates a thrust force for moving the both cam members 17a, 17b in directions that separates them from each other.

Thus, the second cam member 17b is pressed to the side of the main clutch mechanism 10c so that the main clutch mechanism 10c is pressed by the deep wall of the housing 11a and the second cam member 17b and thereby the main clutch mechanism 10c is engaged with friction depending on the frictional engagement force of the friction clutch 14. Consequently, torque transmission is established between the outer case 10a and the inner shaft 10b so that the first propeller shaft 25 and the second propeller shaft 26 turn into a second drive mode (AUTO mode) which is 4-wheel drive located between the non-connecting state and the lock state.

Under this second drive mode, the drive power distribution ratio between the front and rear wheels can be controlled within a range from 100:0 to its locked state depending on the traveling condition of the vehicle.

Under the second drive mode, supply of the excitation current to the electromagnetic coil 13a of the electromagnet 13 is duty-controlled depending on the traveling condition of the vehicle and road surface condition based on signals from various kinds of sensors including the respective rotation sensors 5–8, the throttle opening degree sensor 2, the accelerator pressing amount sensor 9 and the like so as to control the frictional engagement force (that is, transmission torque to the rear wheel side) of the friction clutch 14.

If the excitation current to the electromagnetic coil 13a of the electromagnet 13 is raised to a predetermined lock current which is a constant value, the attraction force of the electromagnet 13 to the armature 15 is increased, so that the armature 15 is attracted strongly thereby the frictional engagement force of the friction clutch 14 being increased. Consequently, the relative rotation between the both cam members 17a and 17b is increased. As a result, the cam follower 17c increases the pressing force to the second cam member 17b, so that the main clutch mechanism 10c turns into coupled condition. Thus, the first propeller shaft 25 and the second propeller shaft 26 turn into a third drive mode (LOCK mode) which is 4-wheel drive in a lock state.

Next, the structure of the ECU 18 and the excitation current control of the electromagnet 13 by the ECU 18 will be described with reference to FIG. 3.

Figure 3:
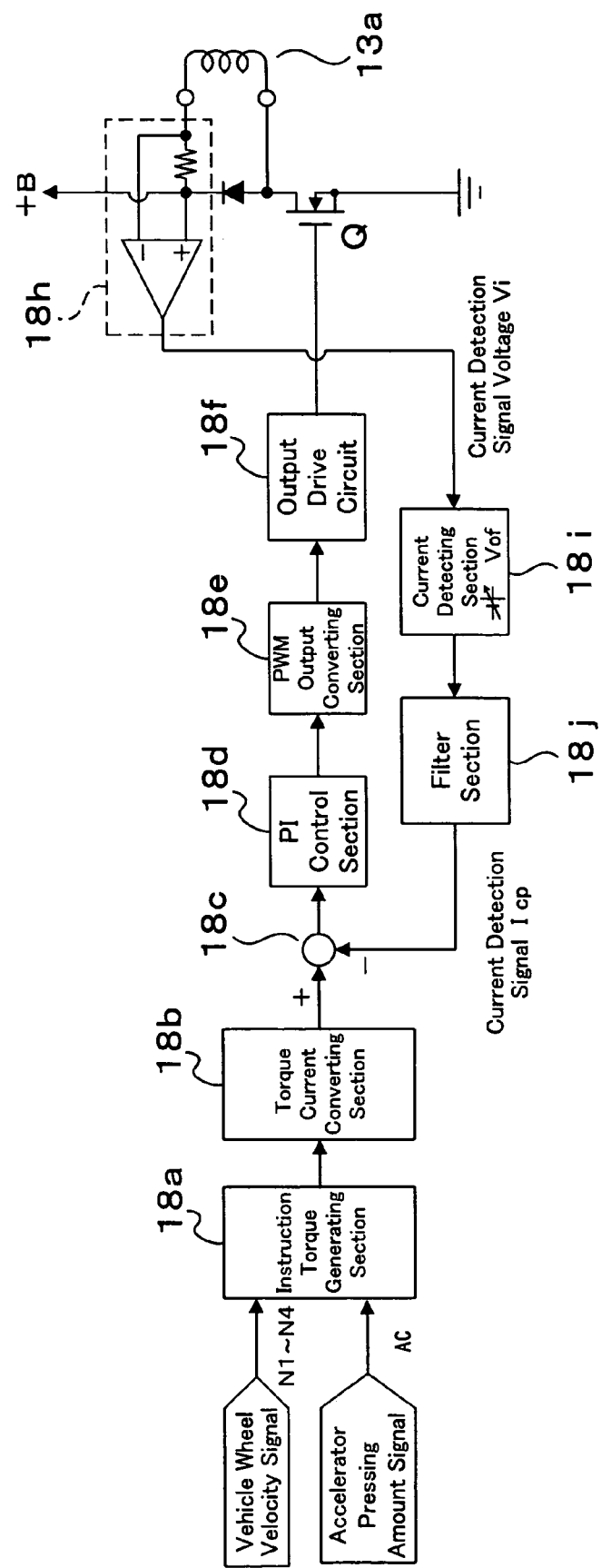
FIG. 3 is a functional block diagram showing the outline of excitation current control of an electromagnet by ECU 18 in the drive power transmission control apparatus according to the embodiment.

The ECU 18 comprises a CPU, memory, I/O interface, A/D converter, output drive circuit 18f, current detection circuit 18h (not shown) and the like and enables control loop processing operation shown in FIG. 3 and the like to be executed according to a predetermined control program stored in the memory.

That is, if vehicle velocity signals N1–N4 or an accelerator pressing amount signal AC are inputted into the CPU through the A/D converter or I/O interface (not shown), an instruction torque is generated by an instruction torque generating section 18a according to a predetermined algorithm or mapping processing using these signal data. A processing for converting the instruction torque generated by this instruction torque generating section 18a to a torque current is carried out by a torque current converting section 18b. Consequently, a current instruction value for generating an object torque is generated and thus, a differential between this current instruction value and a current detection signal Icp detected by the current detecting circuit 18h is obtained by arithmetic operation. This differential is inputted to a PI control section 18d, in which proportional integration control is carried out so as to compute an actually necessary excitation current.

Pulse width modulation is carried out by a PWM output converting section 18e and a switching device Q is switching-controlling through an output drive circuit 18f, so that excitation current is supplied to the electromagnetic coil 13a of the electromagnet 13 connected in series between the switching device Q and a battery B. Consequently, the loop-like circulating magnetic path is formed in the pilot clutch mechanism 10d starting from the electromagnet 13 so as to generate magnetism thereby the electromagnet attracting the armature 15. As a result, the electromagnetic clutch of the pilot clutch mechanism 10d is activated.

On the other hand, the excitation current supplied to the electromagnetic coil 13a is detected by the current detecting circuit 18h. Because the excitation current supplied to the electromagnetic coil 13a is converted to a voltage by a current detecting resistor located between the battery B and the electromagnetic coil 13a, the current detecting circuit 18h is constituted of mainly an operational amplifier so that a current detection signal voltage Vi can be outputted when voltages generated on both ends of the current detecting resistor is inputted into the operational amplifier.

If a current detection signal voltage Vi outputted by this current detecting circuit 18h is inputted to CPU through the A/D converter and the I/O interface (not shown), a current detecting section 18i computes a current detection signal Icp detected according to "linear approximate expression or map of current detection signal voltage Vi and detection current" set up based on an offset voltage Vof set appropriately as described later and this is inputted to an adder section 18c through a filter section 18j for removing unnecessary noise components. Consequently, the differential between the current instruction value by the torque current converting section 18b and the current detection signal Icp is computed by the adder section 18c.

Under the excitation current control on the electromagnet 13 by the ECU 18, the current detection signal voltage Vi detected by the current detecting circuit 18h is converted to the current detection signal Icp with reference to the offset voltage Vof. As described in the Description of the Related Art, as the output voltage from the operational amplifier, the offset voltage is outputted by the operational amplifier constituting the current detecting circuit 18h even when no excitation current is supplied to the electromagnetic coil 13a (excitation current 0 A). With this voltage as the offset voltage Vof, the current detection signal voltage Vi is converted to the current detection signal Icp with a condition that that offset voltage Vof is added.

Thus, if this offset voltage Vof suffers from a voltage deflection or a temperature drift occurs due to changes in the ambient temperature of the current detecting circuit 18h which are generated because of the temperature characteristic of the operational amplifier, resistor and capacitor which constitute the current detecting circuit 18h, it comes that the current detection signal voltage Vi is converted to the current detection signal Icp with reference to the offset voltage Vof containing such a voltage deflection amount. Thus, the current detection signal Icp after the conversion comes to contain errors due to the voltage deflection.

Figure 4:
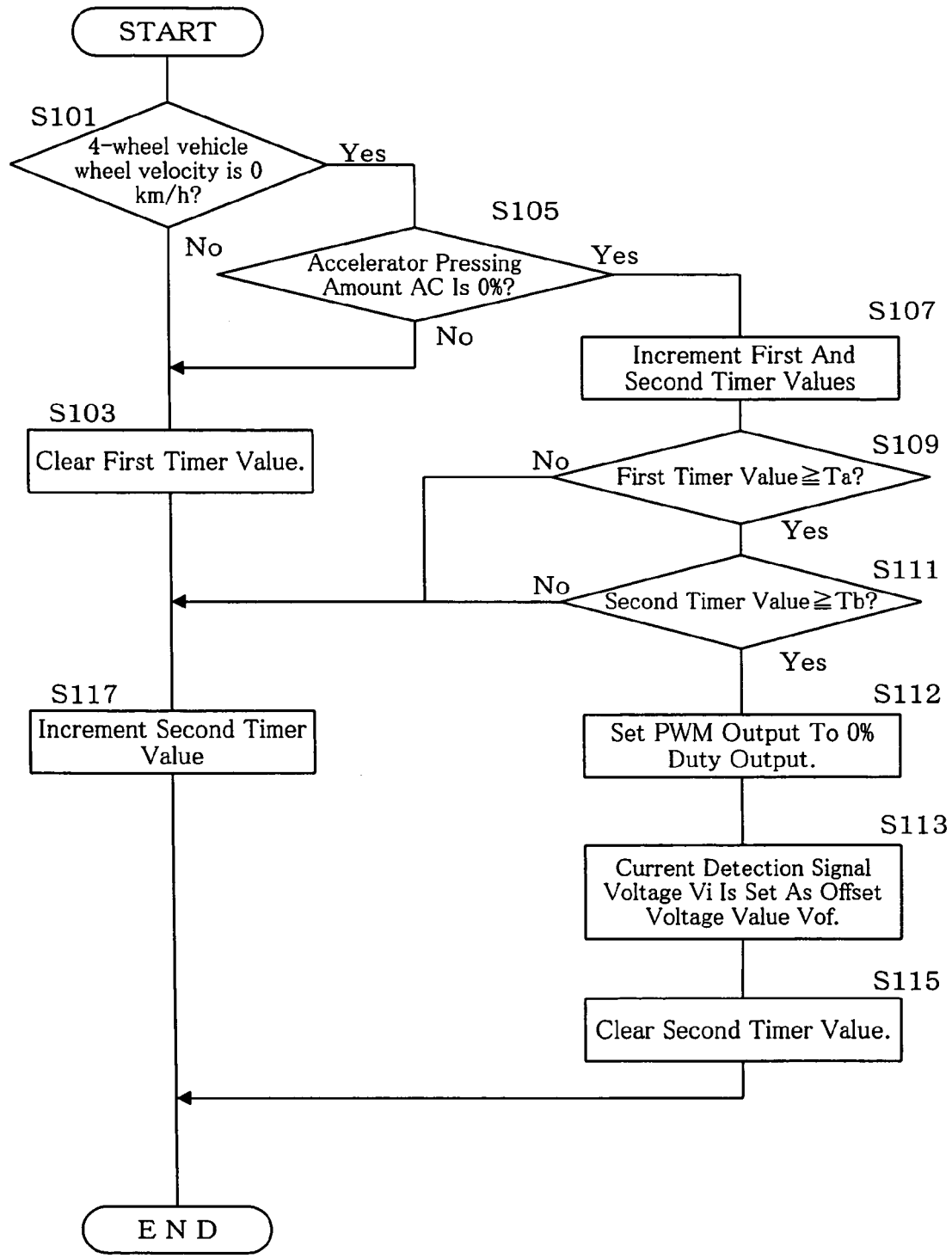
FIG. 4 is a flow chart showing the flow of the offset value setting processing by the ECU in the drive power transmission control apparatus according to the embodiment.

According to this embodiment, the offset value setting processing shown in FIG. 4 is executed by the ECU 18. Here, the offset value setting processing will be described with reference to FIG. 4. This offset value setting processing is executed repeatedly and periodically (for example, every 5 milliseconds) by a predetermined timer interruption processing or the like.

As shown in FIG. 4, as the offset value setting processing, a processing of determining whether or not the 4-wheel velocity is 0 km/h is carried out in step S101 after a predetermined initialization processing. That is, whether or not the velocities of the front wheel 24b and the rear wheel 28b which can be driven with a drive power transmitted by the drive power transmission apparatus 10 are 0 km/h, that is, whether or not the vehicle is stopped is determined.

If it cannot be determined that the 4-wheel velocity is 0 km/h in step S101 (No in S101), the processing proceeds to step S103, in which the first timer value is cleared. This first timer value counts a time in which both the condition that "the 4-wheel velocity is 0 km/h" in step S101 and the condition that "the accelerator pressing amount is 0%" in step S105, which will be explained next, are satisfied.

If it can be determined that the 4-wheel velocity is 0 km/h by the determination processing of step S101 (Yes in S101), the processing proceeds to step S105, in which whether or not the accelerator pressing amount is 0%. That is whether the accelerator pressing amount is 0% or the accelerator pedal is pressed by a vehicle driver is determined based on the accelerator pressing amount signal AC detected by the aforementioned accelerator pressing amount sensor 9.

If it can be determined that the accelerator pressing amount is 0% in step S105 (Yes in S105), the vehicle is stopped or its engine is stopped or idled. Thus, a processing of incrementing the first timer value and the second timer value in next step S107 is carried out. This second timer value is for counting a time since the previously set time in step S113 and prevents the offset voltage value Vof from being set up again within a short period since the previous setting. It is requested through the predetermined constant Tb that it is not set up again within the short period (for example, 10 seconds).

If it cannot be determined that the accelerator pressing amount is 0% by the determination processing of step S105 (No in S105), the engine rotation speed is over the idling state even if the vehicle is stopped. Thus, the processing proceeds to step S103, in which the first timer value is cleared.

If a processing of incrementing the first timer value in step S107 is ended, a processing of determining whether or not the first timer value is over a predetermined constant Ta is carried out in next step S109. This predetermined constant Ta sets up a time-up time of the first timer value and for example, is set up to 100 milliseconds. Consequently, even if both the condition that "the 4-wheel velocity is 0 km/h" in step S101 and the condition that "the accelerator pressing amount is 0%" in step S105 are incidentally satisfied by external noise or the like, the processing proceeds to step S117 if the first timer value is not over the predetermined constant Ta (No in S109). Thus, an event that the offset voltage value Vof is accidentally changed can be prevented.

That is, whether or not the first timer value has reached the preliminarily set predetermined constant Ta is determined and if it cannot be determined that the first timer value has not yet reached the predetermined constant value Ta (No in S109), the processing proceeds to step S117, in which a processing of incrementing the second timer value is carried out. On the other hand, if it can be determined that the first timer value has reached the predetermined constant Ta in step S109 (Yes in S109), the processing proceeds to step S111, in which whether or not the second timer value is over a predetermined constant Tb, or whether or not the second timer value has reached the predetermined constant Tb is determined.

If it cannot be determined that the second timer value has reached the predetermined constant Tb in step S111 (No in S111), a specific time (for example, 10 seconds) has not passed since the previous offset voltage Vof is set up. Thus, the processing proceeds to step S117, in which a processing of incrementing the second timer value is carried out. On the other hand, if it can be determined that the second timer value has reached the predetermined constant Tb in step S111 (Yes in S111), the processing proceeds to next step S112. In step S112, the PWM output is set to 0% duty, so that the real current is 0 A and then, the processing proceeds to step S113.

A processing for setting the current signal detection signal Vi at a current time (at that time) to the offset voltage value Vof is executed. That is, a case where step S113 is executed is the case where both the condition that "the 4-wheel velocity is 0 km/h" in step S101 and the condition that "the accelerator pressing amount is 0%" in step S105 are satisfied. Because the transmission of drive power to the rear wheel is 0(zero)N·m, which is an excellent condition, the PWM output is set to 0% duty and the switching device Q is turned OFF, so that the real current is set to 0A. The current signal detection voltage Vi of the current detecting circuit 18h in this condition is set to the offset voltage value Vof.

When the vehicle is stopped and at the same time, the vehicle driver does not press the accelerator pedal, for example, the engine is stopped or idled, the real current is 0 A and the current signal detection voltage Vi at this time is set to the offset voltage value Vof. Consequently, because the offset voltage value Vof is set up when such a condition is established, that offset voltage value Vof can be reset not only just after a startup but also when this condition is established even if the ambient temperature of the current detecting circuit 18h is raised. Because even if the ambient temperature of the current detecting circuit 18h is raised, the offset voltage value Vof can be set up based on that fact, generation of an error which can be generated in the current detection signal Icp by the temperature drift can be suppressed.

If the offset voltage value Vof is reset in step S113, the processing proceeds to step S115, in which a processing of clearing the second timer value is carried out and then, a series of the offset value setting processing is terminated. Consequently, the second timer value which counts a time passing since a previous setting is initialized. Thus, the offset voltage value Vof is reset next time when the condition "the 4-wheel velocity is 0 km/h" in step S101 and the condition that "the accelerator pressing amount is 0%" in step S105 are satisfied after the second timer value reaches the predetermined constant Tb.

Although whether or not the accelerator pedal pressing amount is 0% is determined in the offset value setting processing explained with reference to FIG. 4, it is permissible to execute a processing for determining whether or not the opening degree of the throttle valve is substantially 0% instead. That is, a throttle opening degree signal m is read through the throttle valve opening degree sensor 2 instead of the accelerator pressing amount sensor 9 shown in FIG. 1 so as to determine whether or not the opening degree of the throttle valve is substantially 0%, that is, whether or not the accelerator pedal is pressed by a vehicle driver. If it can be determined that the opening degree of the throttle valve is substantially 0% in step S105 (Yes in S105), it means that the vehicle is stopped or its engine is stopped or idled. Thus, the processing proceeds to next step S107 and if such determination is impossible (No in S105), it means that the engine is being driven beyond its idling state even if the vehicle is stopped. Thus, the processing proceeds to step S103. As described above, the same operation and effect can be exerted even if the content of the processing by step S105 is replaced.

According to the offset value setting processing by the ECU 18 of the drive power transmission control apparatus 19 of this embodiment, as described above, whether or not the wheel velocities of the front wheels 24c, 24d and the rear wheels 28c, 28d are 0 km/h is determined by the unit 19 in step S101, and whether or not the accelerator pedal pressing amount is 0% is determined in step S105. If it is determined that all the wheel velocities of the front wheels 24c, 24d and the rear wheels 28c, 28d are 0 km/h in step S101 and simultaneously, it is determined that the accelerator pedal pressing amount is 0% in step S105, the current signal detection voltage Vi at that time is set to the offset voltage Vof in step S113.

That is, if the vehicle is stopped and simultaneously the accelerator pedal is not pressed by a vehicle driver, for example, the engine is stopped or idled, the current signal detection signal Vi at that time is set to the offset voltage value Vof. Because the offset voltage value Vof is set up when there conditions are established, that offset voltage value Vof can be reset and set up again if those conditions are available for the ambient temperature even if the ambient temperature of the current detecting circuit 18h is raised. Thus, because the offset voltage value Vof can be set up by taking into account a rise in the ambient temperature of the current detecting circuit 18h even if that temperature is raised, it is possible to suppress generation of a difference which may occur in the current detection signal Icp due to the temperature drift. Therefore, because the control accuracy performance can be improved by executing the differential computation using the current detection signal Icp through the adder section 18c, the torque distribution can be controlled at a high precision.

Because according to the offset value setting processing by the ECU 18 of the drive power transmission control apparatus 19 of this embodiment, step S113 is executed if the second timer value exceeds the predetermined value Tb (Yes in step S111), the setting of the offset voltage value Vof in step S113 is never executed even if the conditions for step S101 and step S105 are established until the second timer value reaches the predetermined value Tb. Consequently, generation of such an unstable condition of the offset value Vof that the set offset value Vof is reset repeatedly in a short period can be prevented. Therefore, the torque distribution can be controlled at a high precision under a stable control performance.

The invention claimed is:

1. An offset adjusting method for a current detection signal in a drive power transmission control apparatus for controlling a transmission amount of drive power by a drive power transmission apparatus by controlling a current, comprising:

first determining whether or not all wheel velocities of vehicle wheels are 0 km/h;

second determining whether or not a pressing amount of an accelerator pedal is 0%; and setting, if it is determined that all the wheel velocities are 0 km/h in the first determining and the pressing amount of the accelerator pedal is 0% in the second determining, a value of the current detection signal at that time to an offset value.

2. The offset adjusting method for a current detection signal in a drive power transmission control apparatus according to claim 1, wherein the setting is carried out after a predetermined period passes since the value of the current detection signal is set to the offset value last.

3. An offset adjusting method for a current detection signal in a drive power transmission control apparatus for controlling a transmission amount of a drive power by a drive power transmission apparatus based on a current detection signal output from a circuit for detecting a current, comprising:

first determining whether or not all wheel velocities of vehicle wheels are 0 km/h;

second determining whether or not an opening degree of a suction throttle valve is substantially 0%; and setting, if it is determined that all the wheel velocities are 0 km/h in the first determining and the opening degree of the suction throttle valve is substantially 0% in the second determining, a value of the current detection signal at that time to an offset value.

4. The offset adjusting method for a current detection signal in a drive power transmission control apparatus according to claim 3, wherein the setting is carried out after a predetermined period passes since the value of the current detection signal is set to the offset value last.

* * * * *